United States Patent [19]

Henry et al.

[11] Patent Number: 4,907,652
[45] Date of Patent: Mar. 13, 1990

[54] PACKER HARROW IMPLEMENT

[75] Inventors: James W. Henry; Paul G. Nadeau, both of Alberta, Canada

[73] Assignee: Renn-Vertec Inc., Vermilion, Canada

[21] Appl. No.: 302,669

[22] Filed: Jan. 27, 1989

[51] Int. Cl.4 .............................................. A01B 73/00
[52] U.S. Cl. .................................... 172/180; 172/311; 172/532
[58] Field of Search ............... 172/119, 149, 150, 151, 172/170, 174, 175, 177, 180, 532, 537, 539, 552, 310, 311

[56] References Cited

U.S. PATENT DOCUMENTS

| | | | |
|---|---|---|---|
| 375,364 | 12/1887 | Dow | 172/532 |
| 433,573 | 8/1890 | Dow | 172/532 |
| 1,045,863 | 12/1912 | Lynch | 172/532 |
| 1,191,404 | 7/1916 | Cummer | 172/532 |
| 1,218,930 | 3/1917 | Cummer et al. | 172/532 |
| 1,788,165 | 1/1931 | Lienhart | 172/532 |
| 1,878,142 | 9/1932 | Hjermstad | 172/532 |
| 2,599,084 | 6/1952 | Archer et al. | 172/311 |
| 2,700,856 | 2/1955 | Summach et al. | 172/532 |
| 2,828,597 | 4/1958 | Moore | 172/311 X |
| 3,796,269 | 3/1974 | Carlucci | 172/149 |
| 4,418,762 | 12/1983 | Page | 172/311 |
| 4,790,389 | 12/1988 | Adee et al. | 172/311 X |
| 4,813,489 | 3/1989 | Just et al. | 172/175 |

FOREIGN PATENT DOCUMENTS

| | | | |
|---|---|---|---|
| 522495 | 3/1956 | Canada | 172/532 |
| 1099566 | 4/1961 | Canada . | |
| 838417 | 4/1970 | Canada . | |
| 871991 | 6/1971 | Canada . | |
| 1081021 | 7/1980 | Canada . | |
| 1212569 | 10/1986 | Canada . | |

OTHER PUBLICATIONS

Morris "Rangler II Packer Harrow Bar" Sales Brochure, Apr. 1989.
"Morris Rod Weeder Co." Article in Agricultural Engineering Magazine, Sep. 1988, vol. 69, No. 6, p. 29.
Blanchard Hydra-Lift Flyer.
The Fuerst Drill Harow Flyer.
Kewanee 80-90 Mulcher Flyer.

*Primary Examiner*—Randolph A. Reese
*Assistant Examiner*—Jeffrey L. Thompson
*Attorney, Agent, or Firm*—Anthony R. Lambert

[57] ABSTRACT

An agricultural implement is disclosed wherein soil packer coils are mounted directly to and between rearwardly extending harrow bars which, in turn, are connected to transversely extending frame members. The harrow tines are located behind the soil packer coils. Each coil is pivotally mounted between a respective pair of harrow arms by means of a pair of link arms which are also free to pivot about the axis of rotation of the coils so that the coils maintain uniform ground engaging contact independent of any up and down movement of the harrow arms.

In one exemplary embodiment, the link arms are provided with axially shortened stub shafts which extend toward each other, generally coincident with the longitudinal axis of the coil, and generally perpendicular to the respective link arms. The stub shafts are receivable within apertures provided in support plates fixed at either end of the coil. In addition, the support plates have affixed thereto, on either side of the apertures, roller bearing assemblies which enable the coil to rotate freely about the otherwise non-rotatable stub shafts.

In another exemplary embodiment, the stub shafts are replaced by half-shafts which extend along the longitudinal axis of the coil, and are separably joined approximately mid-way along the axis of the coil by a sleeve bushing.

11 Claims, 4 Drawing Sheets

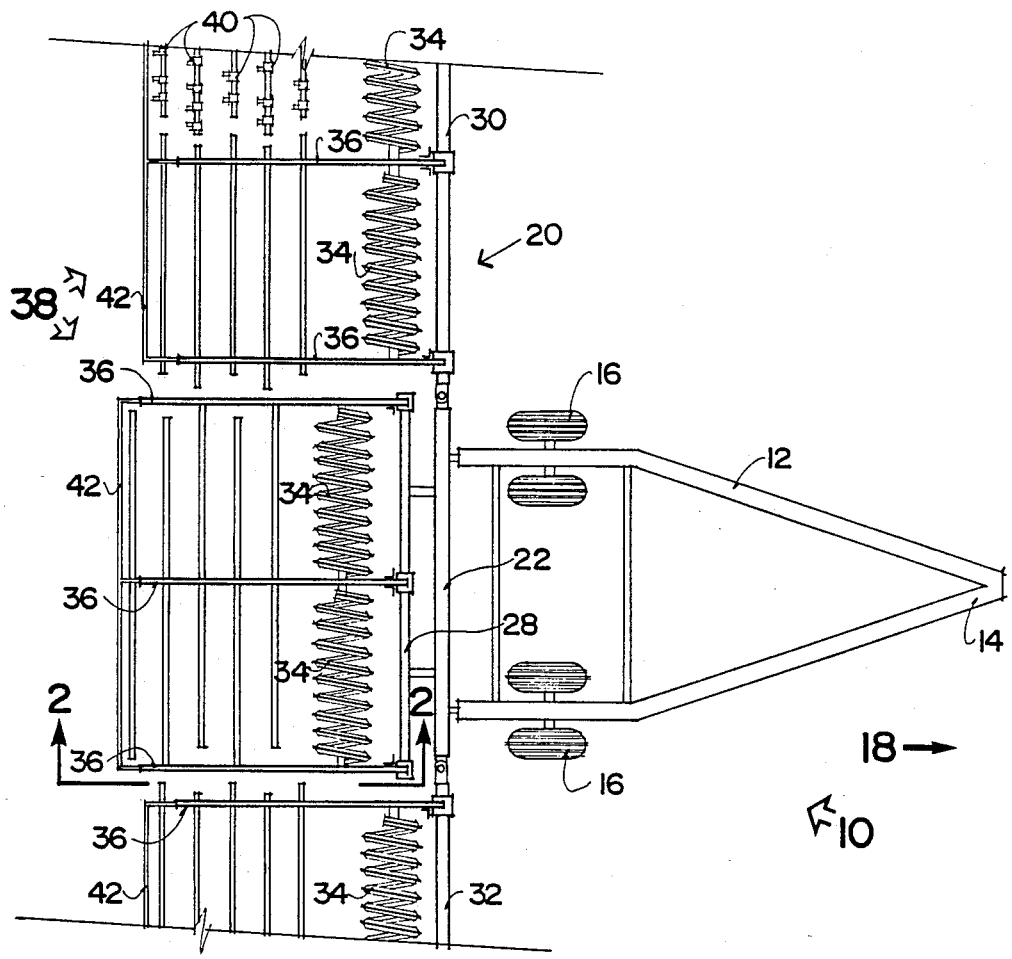
FIGURE '1'
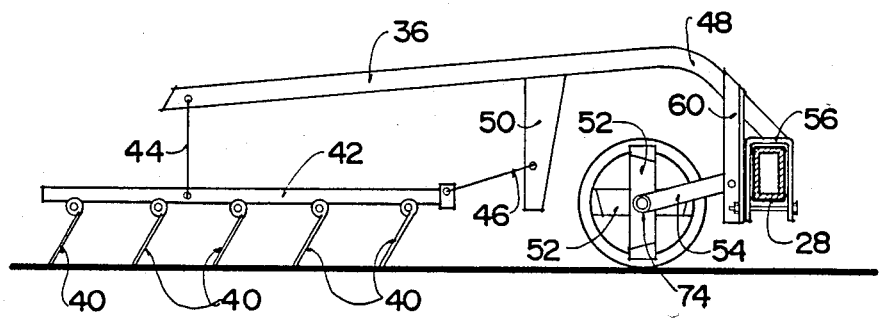
FIGURE '2'

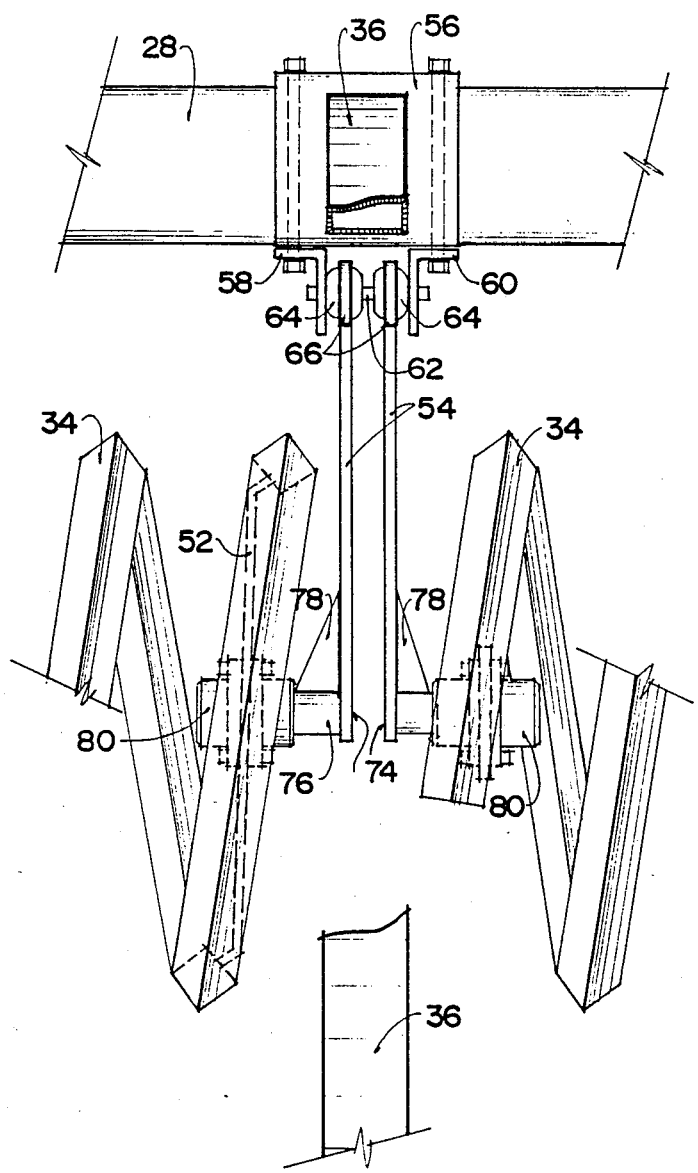
FIGURE '3'

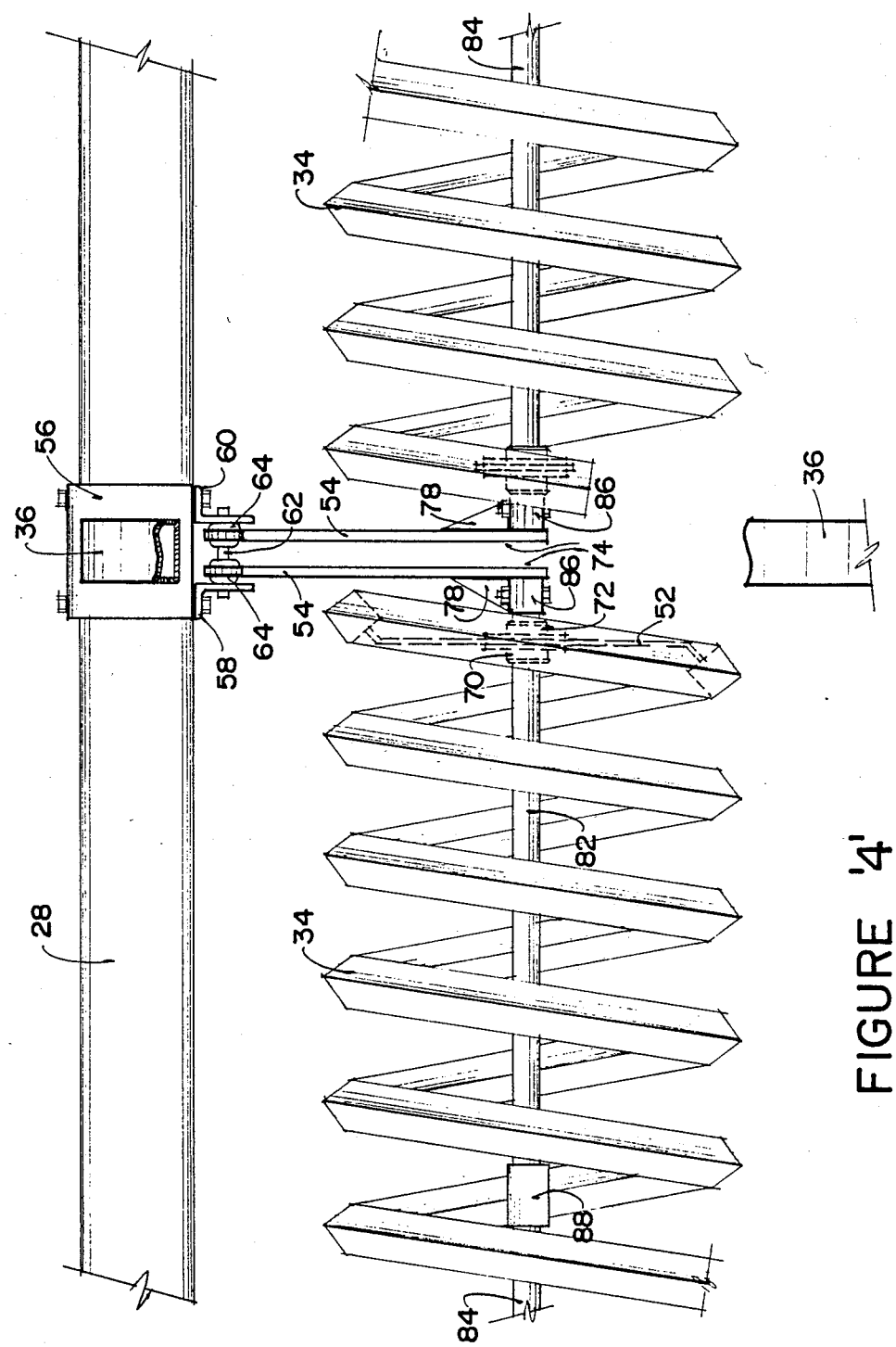
FIGURE '4'

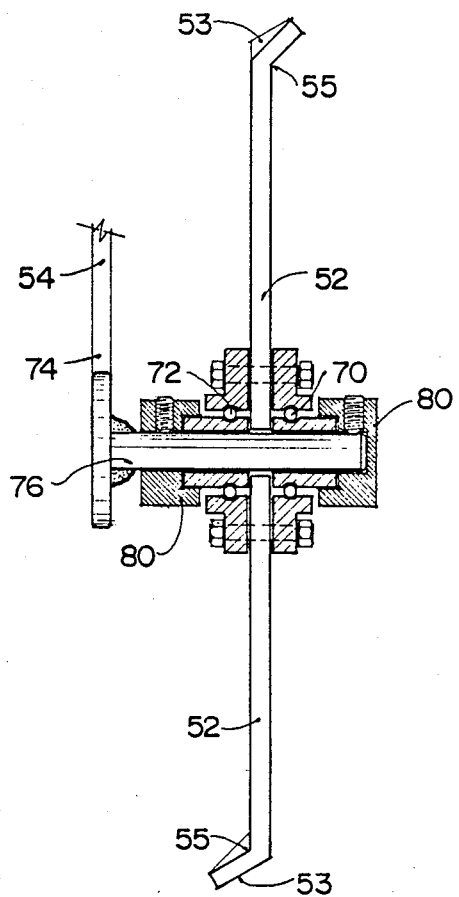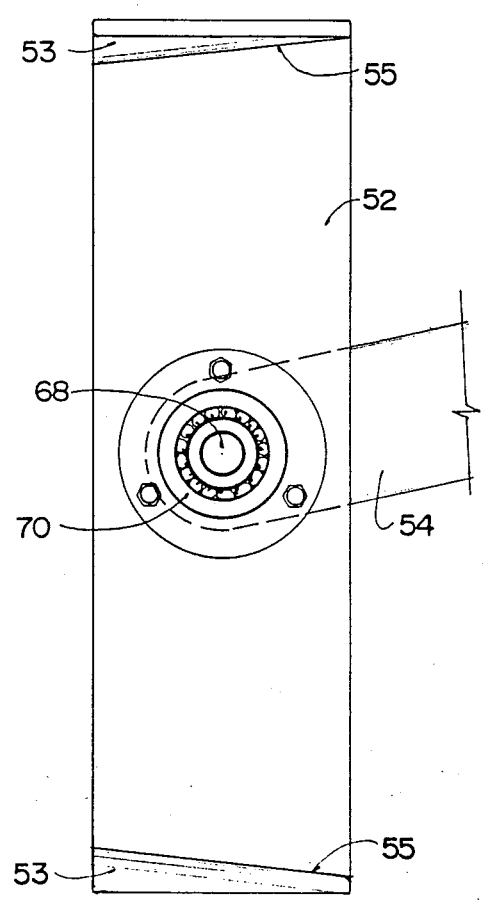
FIGURE '5'    FIGURE '6'

PACKER HARROW IMPLEMENT

BACKGROUND AND SUMMARY OF THE INVENTION

The present invention relates generally to an agricultural implement having a plurality of soil packer units in the form of helical coils which are positioned forward of a harrow assembly, the implement adapted for towing behind a vehicle.

Compaction of soil in the vicinity of newly planted seed has long been known to substantially increase crop yield. It is known to provide soil compaction by a number of relatively heavy packing wheels mounted on a cultivator, but this arrangement has not been completely satisfactory.

More recently, increased interest has been directed toward the concept of soil compaction by means of a series of helical coil packers extending rearwardly of associated harrow assemblies. Examples of such arrangements are shown in U.S. Pat. No. 4,418,762 and Canadian patent Nos. 838,417, 871,991, 1,081,021, 1,099,566, and 1,212,569. However, this arrangement has disadvantages in that clumps or clods of soil, weeds and other debris loosened and raised by the harrow assemblies, are pressed back into the soil by the soil packers.

Agricultural implements have also been designed with soil packer devices located forward of the harrow assemblies. One such example is the Fuerst Flexible Tine Drill Harrow manufactured by Fuerst Brothers, Inc. of Gibson City, Ill. Another is the Kewanee 80-90 Mulcher manufactured by the Kewanee Farm Equipment Co. of Kewanee, Ill.

There is also now available from Morris Rod Weeder Co., Ltd. of Yorkton, Canada, a packer/harrow implement sold under the name Morris Rangler II Packer Harrow Bar, which has a plurality of helical soil packer units directly coupled to a transversely extending, transverse frame member or tool bar. Harrow assemblies are carried behind the packer units by elongated, arched carrier arms connected directly to the frame member and extending over the soil packer units. Each of the packer units is connected by means of short, pivotal links directly to the frame member for up and down shifting movement in substantial independence of any vertical movement of the trailing harrow sections.

A number of benefits are realized by mounting the soil packer units ahead of the harrow sections or assemblies. For example, clumps and clods of soil as well as trash and debris are left on the top of the ground, thereby functioning as a barrier to prevent moisture loss through capillary action. The clumps, clods, trash, etc., reduce wind and water erosion, and the trash cover enhances moisture intake and retention from rain, irrigation, etc. In addition, weeds pulled from the soil by the harrow tines are left on the ground surface to die, instead of being worked into the ground for additional growth as is observed with conventional soil packer/harrow apparatus.

This invention relates to an improvement in packer/harrow implements, such as the Morris implement identified above, and specifically, to an improved mounting arrangement for the soil packer coils.

In accordance with this invention, transversely oriented soil packer coils are mounted directly to a transverse frame adjacent to the rearwardly extending harrow bars which, in turn, are connected to the transversely extending frame member. In this arrangement each coil is located entirely between and substantially transverse to a pair of adjacent harrow arms.

More specifically, each coil is mounted between a respective pair of harrow arms by means of a pair of link arms which pivotally mount the coil directly to the transverse frame directly under the pair of harrow arms. The link arms of each coil are also free to pivot about the longitudinal axis of rotation of the coil so that the coil maintains uniform ground engaging contact independent of any up and down movement of the harrow arms.

Along with the attachment of the soil packer coils directly to the harrow arms, this invention also relates to the manner in which the soil packer coils are mounted for rotation about their own longitudinal axes.

In one exemplary embodiment, the link arms which mount each coil to a pair of adjacent harrow arms are provided with axially shortened stub shafts which extend toward each other, generally coincident with the longitudinal axis of the coil, and generally perpendicular to the respective link arms.

These stub shafts are receivable within apertures provided in support plates fixed at either end of the coil. In addition, the support plates have affixed thereto, on either side of the apertures, roller bearing assemblies which enable the coil to rotate freely about the otherwise non-rotatable stub shafts. In this regard, "non-rotatable" as used above describes the shaft relative to its associated link arm and its own axis. Of course, the shaft is free to rotate, along with the link arm, about the pivot mounting between the link arm and harrow arm.

In another exemplary embodiment, the stub shafts are replaced by a pair of half-shafts which extend along the longitudinal axis of the coil, and are separably joined approximately mid-way along the axis of the coil by a sleeve bushing. The half shafts are fixed at their opposite respective ends to the link arms via a conventional roll pin arrangement which precludes rotation relative to the link arm, but which permits pivotal movement with the link arm about the pivotal mounting between the link arm and harrow arm. The sleeve bushing also permits relative movement between the half-shafts to accommodate uneven or irregular up and down movement of the harrow arms.

Thus, in both embodiments, the arrangement is such that the link arms of each coil are free to move independently of each other in response to uneven movement of the harrow arms, while at the same time permitting free rotation of the coil about its own longitudinal axis.

Other objects and advantages will become apparent from the detailed description of the preferred exemplary embodiments which follows.

BRIEF DESCRIPTION OF THE DRAWINGS

FIG. 1 is a partial plan view, in schematic form, of a packer/harrow implement in accordance with the invention;

FIG. 2 is a side schematic view taken along the line 2—2 of FIG. 1;

FIG. 3 is a partial plan view of a soil packer coil mounting arrangement in accordance with a first exemplary embodiment of the invention;

FIG. 4 is a partial plan view of a soil packer coil mounting arrangement in accordance with a second exemplary embodiment of the invention;

FIG. 5 is a sectional view of a bearing and support plate assembly in accordance with the invention; and FIG. 6 is a side view of a coil support plate and bearing assembly in accordance with the invention.

DETAILED DESCRIPTION OF THE DRAWINGS

An agricultural implement in accordance with the invention, and broadly designated by the numeral 10 in FIG. 1, includes a conventional hitch structure 12 having a forward end portion 14. The hitch structure 12 is supported by two pair of wheels 16, and the forward end portion 14 of the hitch structure 12 is adapted for connection to a towing vehicle (not shown) that is movable in an advancement direction over the ground and along a path of travel, in a direction indicated by the arrow 18.

As best illustrated in FIG. 1, the implement 10 has a main frame 20 supported by wheels (not shown) at opposite ends thereof, and which comprises a center section or member 22 and side sections or members 30 and 32. Auxiliary frame member 28 is attached to the center section 22 in a conventional manner. The overall configuration of the implement frame, hitch and associated means by which the frame sections may be pivoted to an inoperative or transport position may be generally similar to the above-identified Morris implement and form no part of this invention. Accordingly, no detailed description of these aspects of the implement are required here.

The implement 10 further includes a number of soil packer coils 34 which are disposed directly behind the respective frame members 28, 30 and 32. Each of the packer coils 34 comprises a generally cylindrically shaped helical coil as best seen in FIGS. 1, 3 and 4.

As will be described further hereinbelow, the packer coils 34 are mounted for rolling engagement with the ground, while rotating about their respective longitudinal axes of rotation. In an exemplary embodiment of the invention, the coils 34 are each pivotally mounted to and between a pair of adjacent harrow arms 36 which extend rearwardly, substantially perpendicular to the frame members 28, 30 and 32 to which they are fixedly secured.

The harrow arms 36 carry a gridwork 38 of individual tine members 40 in a manner well understood by those skilled in the art. The gridwork 38 is made up of individual assemblies 42 (FIG. 2) which are suspended from the harrow arms 36 by flexible link means cables or chains 44, 46. Again, this is a conventional arrangement and forms no part of the subject invention, per se, except insofar as it is part of the overall combination of components. Each of the harrow arms 34 is also formed with an arched section 48 that curves over and between the coils 34 to provide adequate clearance therebetween. A relatively short, downwardly extending leg 50 is fixed to each of the arms 36 directly behind the arched section 48 in substantially transverse relation to the direction of extension of arms 36, and provides a point of attachment for cable or chain 46.

Each of the coils 34 is provided at opposite ends with support plates 52 which reinforce and maintain the cylindrical configuration of the coils. The plates are preferably welded to the endmost convolutions on either side of the coil. As described in more detail below, these plates also provide mounting means for facilitating connection of the coils to the harrow bars in such a way that the coils 34 are free to rotate about their own longitudinal axes while, at the same time, being free to pivot or swing about pivot axes fixed to the harrow bars.

Each coil 34 is pivotally mounted to and between an adjacent pair of harrow arms 36 by a pair of link arms 54. Since each such coil mounting arrangement is identical, only one need be described in detail. With reference now to FIGS. 2, 3 and 4, it will be seen that each harrow arm 36 is mounted to a respective frame member 28, 30 or 32 by a mounting bracket 56 which is secured thereto by any suitable means, such as welding, bolts, etc. Each harrow arm also includes a pair of angle supports 58, 60 which are welded or otherwise rigidly secured to, and extend downwardly from, either side of the harrow arm 36. The angle brackets 58, 60 engage one of the brackets 56 at their respective lower ends and may be secured to the lower end of bracket 56, beneath the associated frame member, e.g., member 28 as illustrated in FIG. 2, by any suitable means.

The pair of angle supports 58, 60 serve to capture therebetween, and intermediate the respective upper and lower ends of the angle supports, a pair of ball and socket type joints 64 by means of a pin 62 as best seen in FIG. 3. The joints 64 are located at first ends 66 of a pair of adjacent link arms 54 associated with adjacent coils 34. In this regard, it will be appreciated that the pin 62 passes through aligned apertures (not shown) in the angle supports 58, 60, as well as bores (not shown) provided in the respective ball and socket joints 64.

The ball and socket connections or joints 64 permit, within limits, universal movement of the link arms 54 relative to the harrow arms 36 during travel of the implement over uneven or irregular surfaces.

The pin 62 is releasably retained in place by means of a hair clip or cotter pin in a conventional manner, so that the packer coils 34 may be readily detached from the implement 10 for maintenance, repair or replacement.

It will be appreciated that the above-described arrangement is modified for the ends of those coils 34 which are connected to harrow bars 36 at the ends of the frame members 28,30, or 32, i.e., where there is no adjacent coil. In these locations, only a single link arm 54 and associated ball and socket joint 64 is pivotally mounted between angle supports 58, 60.

It can now be appreciated that during use of the implement 10, the short, pivotal links 54 directly interconnecting the coil packers 34 and the harrow arms 36 permit pivotal movement of the coils about the pivot pins 62. At the same time, due to the inherent resilience of coils 34, the link arms 54 of any one coil are pivotable to some extent relative to each other. Moreover, the ball and socket connectors 64 function to enable the packer coils 34, and particularly the central, longitudinal axes of the coils 34, to tilt slightly in either direction from horizontal in order to follow the contours of the ground without affecting the position or orientation of the respective trailing harrow sections.

The arched or raised sections 48 of the harrow arms 36, as well as the rearward placement of leg members 50, provide sufficient clearance for coils 34 to move in complete freedom over large stones or other obstacles in the field without damage.

With specific reference to FIG. 3, a link arm-to-coil mounting arrangement in accordance with one exemplary embodiment of the invention includes a coil body 34, as previously described, provided with a pair of plates 52, one at either end of the coil.

Plates 52 are welded across the endmost convolutions of each coil to provide rigidity to the coil and to serve as a support for shaft means which permit the coil to rotate about its longitudinal axis. Each has a central aperture 68 formed therein, with roller bearing assemblies 70 and 72 mounted on either side of the plate in axial alignment with the aperture 68, as best seen in FIGS. 5 and 6.

In addition, the endmost portions 53 of plate 52 are bent in opposite directions as indicated in FIG. 6 and as shown in phantom in FIGS. 3 and 4. The lines 55 about which the ends are bent are oppositely inclined relative to horizontal. This allows the plate to be welded along opposite edges to the opposite surfaces of the coil as best seen in FIGS. 3 and 4.

In this embodiment, each link arm 54 is provided at its lower end 74 with a stub shaft 76, preferably welded thereto and reinforced by a gusset 78 extending between the stub shaft and link arm. The stub shaft is received through the aperture 68 and associated bearing assemblies 70, 72 of the plate 52. At the same time, locking collars 80 lock the inner bearing races of both bearing assemblies 70, 72 to the stub shaft 76 and also prevent separation of the coil and link arm/stub shaft assembly. It will be understood that the above described roller bearing assemblies are of conventional construction, as are the locking collar 80. For example, suitable bearing assemblies which may be used in this invention are the Fafnir GRA-RR Series and RR Flangette Units manufactured by Fafnir. It will also be appreciated that the inner races may be secured to the shaft by means other than locking collars 80, e.g., by set screws, etc.

The double bearing arrangement on each support plate 52 maintains the stub shafts 76 substantially perpendicular to the support plates 52, thus permitting independent movement of the link arms 54 associated with any one of the soil packer coils 34.

By thus mounting the soil packer coil 34 to stub shafts 76 at either end thereof, it will be appreciated that the coil is itself free to rotate about its own longitudinal axis defined by the non-rotatable stub shafts 76. At the same time, the link arms 54 are free to pivot about the pins 62 of the universal ball and socket joints 64 to accommodate up and down, as well as any twisting movement, imparted to the harrow arms 36 as a result of movement of the implement over uneven terrain, etc.

Turning now to FIG. 4, an alternative exemplary embodiment of the invention is disclosed, and wherein similar reference numerals are utilized to refer to common components.

In this exemplary embodiment, a pair of axle half-shafts 82, 84 are utilized in place of the stubs shafts 76 of the FIG. 3 embodiment.

The one axle half shaft 82 is fixed to a link arm 54 by means of a roll pin 86 which fixes the shaft against rotation relative to the link arm, but which permits disassembly for maintenance and/or replacement.

The half shaft 82 extends axially substantially to the center of the coil, where it is joined to the other half shaft 84, by a sleeve bushing 88. The bushing 88 is sized to permit rotation so that the half shafts 82, 84 are permitted to rotate relative to each other as a result of uneven movement of the associated harrow arms. The bearing assembly arrangement is the same as that described in the FIG. 3 embodiment, although the inner bearing assembly, i.e., on the main coil body side of plate 52, can be omitted if desired since the bushing 88 stabilizes the axial orientation of the half-shafts.

In use, it will be appreciated that each of the coils 34 rolls smoothly over the ground during advancement of the implement 10 to roll and pack the soil and thereby enable the harrow assemblies 42 to travel along a smoother path. In addition, the trailing harrow assemblies 42 smooth and level the ground, pull up weeds and leave trash and coarse particles on the ground surface to thereby reduce wind and water erosion, and enhance soil moisture retention.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An agricultural implement adapted for towing behind a driven vehicle in a first forward direction and comprising:

an elongated frame assembly extending substantially transverse to said first direction;

means for supporting a harrow assembly comprising a plurality of harrow arms extending in a rearward direction, said harrow arms being fixedly attached to said frame assembly at spaced locations therealong;

a plurality of rotatable soil packer coils, each of which is located entirely between a respective pair of harrow arms, and each of which is pivotally mounted to said frame adjacent said respective pair of harrow arms by first and second link means at either end of said coil. whereby said link means allows for up and down movement of said packer coils independent of and unobstructed from said harrow arms.

2. An agricultural implement as in claim 1, wherein said first and second link means comprises first and second link arms, each having a first end adapted for connection to the frame under one of said respective pair of harrow arms, and the second end fixed to shaft means about which said coil rotates, such that each of the first and second link arms rotates substantially in a vertical plane containing one of said respective pair of harrow arms.

3. An agricultural implement as in claim 2 wherein said shaft means comprise first and second half-shafts, said packer coil mounted for rotation about and relative to said half shafts, and wherein said half shafts are joined substantially midway within said coil by sleeve means permitting relative rotation therebetween.

4. A soil packer and harrow implement as in claim 1 wherein each of said coils includes a support plate at either end thereof, each said support plate having an aperture for receiving a shaft means, each said plate having opposed end which are inclined oppositely with respect to each other and relative to a line perpendicular to the length of the support plate.

5. A agricultural implement as claimed in claim 4 wherein each harrow arm with the exception of the outermost harrow arms is positioned above a pair of said link arms associated with adjacent packer coils.

6. An agricultural implement adapted for towing behind a driven vehicle in a first forward direction and comprising:

an elongated frame assembly extending in a substantially transverse direction;

a plurality of harrow arms extending in a rearward direction, said harrow arms being fixedly attached to such frame assembly at space locations therealong;

a plurality of rotatable soil packer-coils; each of which is located between a respective pair of harrow arms, and each of which is mounted to said frame adjacent said respective pair of harrow arms by first and second link means at either end of said coil;

said shaft means including first and second half-shafts, said packer-coil mounted for rotation about and relative to said half-shafts, and wherein said half-shafts are joined substantially midway within said coil by sleeve means permitting relative rotation therebetween.

7. An agricultural implement as claimed in claim 6 further comprising flexible link means connected to said harrow arms, and a plurality of times connected to said flexible link means.

8. An agricultural implement as claimed in claim 6 wherein each packer-coil is provided with a support plate at either end thereof, each plate having an aperture for receiving a respective one of said half-shafts, each of said plates also having bearing means on at least one side thereof in axial alignment with said aperture for facilitating rotation of said coil relative to said half-shafts.

9. An agricultural implement as claimed in claim 6 wherein each harrow with the exception of the two outermost harrow arms is positioned above a pair of said link arms associated with adjacent packer coils.

10. A soil packer and harrow implement comprising frame means extending generally transverse to a normal forward direction of movement of the implement;

a plurality of harrow arms mounted to said frame means at laterally spaced locations therealong;

said harrow arms supporting a plurality of harrow tines connected to said harrow arms by flexible link means;

a plurality of rotatable soil packer coils located forward of said harrow tines;

and wherein each of said coils is located, and pivotally mounted to the frame, between a pair of harrow arms, and further wherein each of said coils is rotatable about relatively fixed shaft means;

each of said coils including an elongate support plate at either end thereof, each support plate having an aperture for receiving said shaft means;

each said plate being bent at opposite ends thereof in opposite directions;

wherein bend lines about which said opposite ends are bent are inclined oppositely with respect to each other and relative to a line perpendicular to the length of the support plate.

11. An agricultural implement as claimed in claim 10 wherein each harrow arm with the exception of the two outermost harrow arms is positioned above a pair of said link arms associated with adjacent packer coils.

* * * * *